(12) United States Patent
Bögl et al.

(10) Patent No.: US 8,180,627 B2
(45) Date of Patent: May 15, 2012

(54) METHOD AND AN APPARATUS FOR CLUSTERING PROCESS MODELS

(75) Inventors: Andreas Bögl, St. Nikola (AT); Mathias Goller, Pfarrkirchen (DE); Alexandra Grömer, Santiago (CL); Gustav Pomberger, Linz (AT); Norbert Weber, Glonn (DE)

(73) Assignee: Siemens Aktiengesellschaft, Munich (DE)

( * ) Notice: Subject to any disclaimer, the term of this patent is extended or adjusted under 35 U.S.C. 154(b) by 986 days.

(21) Appl. No.: 12/166,647

(22) Filed: Jul. 2, 2008

(65) Prior Publication Data

US 2010/0004923 A1 Jan. 7, 2010

(51) Int. Cl.
*G06F 17/27* (2006.01)
(52) U.S. Cl. ............... 704/9; 704/245; 704/257
(58) Field of Classification Search .......... 704/243, 704/244, 245, 250, 257, 1–10, 251, 270, 704/270.1; 1/1
See application file for complete search history.

(56) References Cited

U.S. PATENT DOCUMENTS

| | | | |
|---|---|---|---|
| 6,654,731 B1 | 11/2003 | Mahesh | |
| 7,246,125 B2 * | 7/2007 | Bradley et al. | 1/1 |
| 2004/0010497 A1 | 1/2004 | Bradley et al. | |

FOREIGN PATENT DOCUMENTS

EP 0513652 A2 11/1992

* cited by examiner

*Primary Examiner* — Huyen X. Vo

(57) ABSTRACT

The invention relates to an apparatus for clustering process models each consisting of model elements comprising a text phrase which describes in a natural language a process activity according to a process modeling language grammar and a natural language grammar, wherein said apparatus comprises a process object ontology memory for storing a process object ontology, a distance calculation unit for calculating a distance matrix employing said processing modeling language grammar and said natural language grammar, wherein said distance matrix consists of distances each indicating a dissimilarity of a pair of said process models, and a clustering unit which partitions said process models into a set of clusters based on said calculated distance matrix.

5 Claims, 9 Drawing Sheets

|         | Model A     | Model B     | Model C   | ...  | Model n |
|---------|-------------|-------------|-----------|------|---------|
| Model A | 0           |             |           |      |         |
| Model B | dist (B,A)  | 0           |           |      |         |
| Model C | dist (C,A)  | dist (C,B)  | 0         |      |         |
| ...     | ...         | ...         | ...       | ...  |         |
| Model n | dist (n,A)  | dist (n,B)  | dist (n,C)| ...  | 0       |

METHOD AND AN APPARATUS FOR CLUSTERING PROCESS MODELS

TECHNICAL BACKGROUND

The invention relates to a method and an apparatus for clustering process models and, in particular, to a method and an apparatus for ontology-based clustering of process models.

There exists a wide variety of processes, such as work processes in organizations or manufacturing processes for manufacturing or assembling devices. Processes can be described by using process models. Processes are modeled using different kinds of process modeling languages. An example for a process modeling language is the unified model language (UML). Processes can also be described by event-driven process chains (EPC). An EPC (Event-driven Process Chain) can be used, for example to define a business process workflow and is generated by EPC-tools. An event-driven process chain EPC is an ordered graph of events and functions. An EPC-graph provides various connectors that allow alternative and parallel execution of processes. Furthermore, there are specified logical operators, such as OR, AND or XOR.

A process model comprises a graph, wherein model elements are formed by nodes and relationships are normally represented by edges between said nodes. Process models can be stored in a data base.

For different applications, such as project planning in different fields, different kinds of process models are generated using different process modeling languages. The generated process models are stored in a database. Some of these process models are implemented in a real process or workflow. The implementation of a process model takes time and resources and can result in processes of different quality and efficiency.

A user faced with the task to analyze existing processes or to set up new processes, can evaluate process models stored in the database. The user can, for example define a process by generating a process model and look for other process models stored in the database which are similar to his process model or which fit to the required process. By finding a matching process model, the further implementation of the process model is facilitated and the user has the possibility to analyze whether the process model stored in the database and found during the search has led to an efficient implementation of the respective process. Accordingly, a user before implementing the defined process model can look at the implementation of an already implemented matching process model and decide whether the results of the already implemented process model are sufficient for the respective purposes of the new process model.

A manual search for matching process models is very time-consuming since in a conventional database a plurality of process models in different process model languages are stored. In a database, many thousands of different process models can be stored.

Accordingly, it is an object of the present invention to provide a method and an apparatus for finding automatically matching process models.

SUMMARY OF THE INVENTION

The invention provides a method for clustering process models each consisting of model elements comprising a text phrase which describes in a natural language a process activity according to a process modeling language grammar and a natural language grammar, wherein a distance matrix is calculated employing both grammars, each distance of said distance matrix indicating a dissimilarity of a pair of said process models, wherein said process models are partitioned into a set of clusters based on said calculated distance matrix.

In an embodiment of the method according to the present invention, said process models comprise a UML-model, a EPC-model, a ERM-model or a petri-network.

In an embodiment of the method according to the present invention, each model element can be formed by a function model element, an event model element or an operator model element.

In an embodiment of the method according to the present invention, said model elements are labeled by text phrases each comprising at least one term.

In an embodiment of the method according to the present invention, terms within a model element are classified according to said natural language grammar into different word types comprising nouns, verbs, articles, conjunctions, prepositions and adjectives.

In an embodiment of the method according to the present invention, stop words of predetermined stop word types are filtered from said terms.

In an embodiment of the method according to the present invention, said stop word types comprise prepositions, articles and conjunctions.

In an embodiment of the method according to the present invention, at a native calculation level (level 0) a distance between a first process model (x) and a second process model (y) is calculated depending on the number of model elements (b) which form part only of the second process model (y), the number of model elements (c) which form part only of the first process model (x) and depending on model elements (a) which form part of both process models (x, y).

In an embodiment of the method according to the present invention, on said native calculation level, a Jaccard distance between two process models (x, y) is calculated as follows:

$$dist_{Jaccard}(x, y) = \frac{b+c}{a+b+c}$$

wherein b is the number of model elements which form only part of the second process model (y), c is the number of model elements which form only part of the first process model (x), and a is the number of model elements which form part of both process models (x, y).

In an embodiment of the method according to the present invention, on a term calculation level (level 1) a distance between a first process model and a second process model is calculated on the basis of terms both processed models have in common.

In an embodiment of the method according to the present invention, a text vector is generated for each process model indicating a frequency of occurrence of terms in said process model.

In an embodiment of the method according to the present invention, on said term calculation level a distance between two process models (x, y) having text vectors $v(x)=(x_1, \ldots, x_n)$ and $v(y)=(y_1, \ldots, y_n)$ is calculated as follows:

$$dist_{Cosinus}(x, y) = 1 - \frac{\sum_{i=1}^{n} x_i \cdot y_i}{\sqrt{\sum_{i=1}^{n} x_i^2} \cdot \sqrt{\sum_{i=1}^{n} y_i^2}}$$

wherein $x_i$, $y_i$ indicates the frequency of occurrence of a $term_i$.

In an embodiment of the method according to the present invention, on an object calculation level (level 2) a distance between a first process model and a second process model is calculated on the basis of a process object ontology.

In an embodiment of the method according to the present invention, a process object is formed by a term of a predetermined word type.

In an embodiment of the method according to the present invention, the word type of said process object is a noun.

In an embodiment of the method according to the present invention, said term is a term within a function model element or within an event model element of said process model.

In an embodiment of the method according to the present invention, a process activity of a process defined by the respective process model is applied to said process object.

In an embodiment of the method according to the present invention, on said object calculation level a distance between two process models (x, y) is calculated as follows:

$$dist_{PO}(x, y) = \frac{\sum_{p_x \in M_x} dist_{min}(p_x, M_y) + \sum_{p_y \in M_y} dist_{min}(p_y, M_x)}{|M_x| + |M_y|}$$

wherein
$dist_{min}(p_x, M_y)$ is the minimum distance between a process object $p_x$ of a model element of a first process model (x) and a set ($M_y$) of process objects $p_y$ of a second process model (y) in said process object ontology:

$$dist_{min}(p_x, M_y) = \min\{dist_{ont}(p_x, p_y)\}$$

wherein $dist_{min}(p_y, M_x)$ is a minimum distance between a process object $p_y$ of a model element of a second process model (y) and a set $M_x$ of process objects $p_x$ of a first process model (x) in said process object ontology:

$$dist_{min}(p_y, M_x) = \min\{dist_{ont}(p_y, p_x)\}$$

wherein $|M_x|+|M_y|$ is the total number of process objects.

In an embodiment of the method according to the present invention, a distance between process objects $p_x$, $p_y$ in the processed object ontology is calculated as follows:

$$dist_{Ont}(p_x, p_y) = \\ 1 - \max_{p \in paths(p_x, p_y)} \{weight_{migr}^{migr(p)} \cdot weight_{gen}^{gen(p)} \cdot weight_{sib}^{sib(p)} \cdot weight_{mer}^{mer(p)}\}$$

wherein $weight_{migr}$ is a weight of a migrate-to-relationship and migr(p) is the number of migrate-to-relationships along a path p;

$weight_{gen}$ is a weight of a generalization-relationship and gen(p) is the number of generalization-relationships along a path p;

$weight_{sib}$ is a weight of a sibling-relationship and sib(p) is the number of sibling-relationships along a path p; and $weight_{mer}$ is a weight of a meronyme- or part-of-relationship and mer(p) is the number of meronyme- or part-of-relationships within said process object ontology.

In an embodiment of the method according to the present invention, on an activity calculation level (level 3) a distance between a first process model and a second process model is calculated on the basis of a process object ontology and process activities of model elements of said process models.

In an embodiment of the method according to the present invention, a process activity is formed by a term of a predetermined word type.

In an embodiment of the method according to the present invention, said word type of said process activity is a verb.

In an embodiment of the method according to the present invention, said term is a term within a function model element or within an event model element of said process model.

In an embodiment of the method according to the present invention, on said activity calculation level a distance between two process models (x, y) is calculated as follows:

$$dist_{POActivity}(x, y) = \frac{\sum_{a_x \in A_x} dist_{min}(a_x, A_y) + \sum_{a_y \in A_y} dist_{min}(a_y, A_x)}{|A_x| + |A_y|}$$

wherein $dist_{min}(a_x, a_y)$ is the minimum distance between a process activity ($a_x$) of a model element of a first process model (x) on the set ($A_y$) of process activities ($a_y$) of a second process model (y) in said process object ontology:

$$dist_{min}(a_x, A_y) = \min\{dist_{activity}(a_x, a_y)\}$$

wherein
$dist_{min}(a_y, A_x)$ is the minimum distance between the process activity ($a_y$) of a model element of said second process model (y) on the set ($A_x$) of process activities ($a_x$) of the first process model (x) in said process object ontology:

$$dist_{min}(a_y, A_x) = \min\{dist_{activity}(a_y, a_x)\}$$

wherein
$|A_x|+|A_y|$ is the total number of process activities.

In an embodiment of the method according to the present invention, the distance between process activities $a_x$, $a_y$ in said process object ontology is calculated as follows:

if activities $a_x$, $a_y$ are dissimilar, the distance is calculated as follows:

$$dist_{activity}(a_x, a_y) = 1$$

otherwise:

$$dist_{activity}(a_x, a_y) = weight_{PO} \cdot dist_{ont}(p_x, p_y)$$

wherein $dist_{ont}(p_x, p_y)$ is the distance between process objects $p_x$, $p_y$ in said process object ontology.

In an embodiment of the method according to the present invention, said process models are partitioned into a set of clusters by means of a medoid-based clustering algorithm.

In an embodiment of the method according to the present invention, said medoid-based clustering algorithm is a CLARANS-algorithm.

In an embodiment of the method according to the present invention, said process models are stored in a process model memory.

In an embodiment of the method according to the present invention, said process object ontology is stored in a process object ontology memory.

The invention further provides an apparatus for clustering process models each consisting of model elements comprising a text phrase which describes in a natural language a process activity according to a process modeling language grammar and a natural language grammar, wherein said apparatus comprises:
(a) a process object ontology memory for storing a process object ontology;
(b) a distance calculation unit for calculating a distance matrix employing said processing modeling language grammar and said natural language grammar, wherein said distance matrix consists of distances each indicating a dissimilarity of a pair of said process models; and
(c) a clustering unit which partitions said process models into a set of clusters based on said calculated distance matrix.

In an embodiment of the apparatus according to the present invention, the distances are calculated by said distance unit according to a selected calculation level.

In an embodiment of the apparatus according to the present invention, said calculation level of said distance calculation unit is selectable between:
a native calculation level,
a term calculation level,
an object calculation level,
an activity calculation level.

In an embodiment of the apparatus according to the present invention, said clustering unit partitions said process models by means of a medoid-based clustering algorithm.

In an embodiment of the apparatus according to the present invention, said process modeling language comprises UML (Unified Model Language)-model, an EPC (Event-driven Process Chain)-model, or a petri-network.

In an embodiment of the apparatus according to the present invention, the model element comprises a function model element, an event model element and an operator model element.

In an embodiment of the apparatus according to the present invention, said model elements are labeled by text phrases each comprising at least one term.

The invention further provides an apparatus for calculating a dissimilarity between process models each consisting of model elements comprising a text phrase which describes in a natural language a process activity according to a process modeling language grammar and a natural language grammar, said apparatus comprising:

a process object ontology memory for storing a process object ontology; and a distance calculation unit for calculating a distance matrix consisting of distances indicating a distance similarity of a pair of said process models.

The invention further provides a computer program comprising computer programs for performing the method according to the present invention.

The invention further provides a data carrier which stores a computer program comprising commands for performing the method according to the present invention.

DETAILED DESCRIPTION OF PREFERRED EMBODIMENTS

Figure 1:
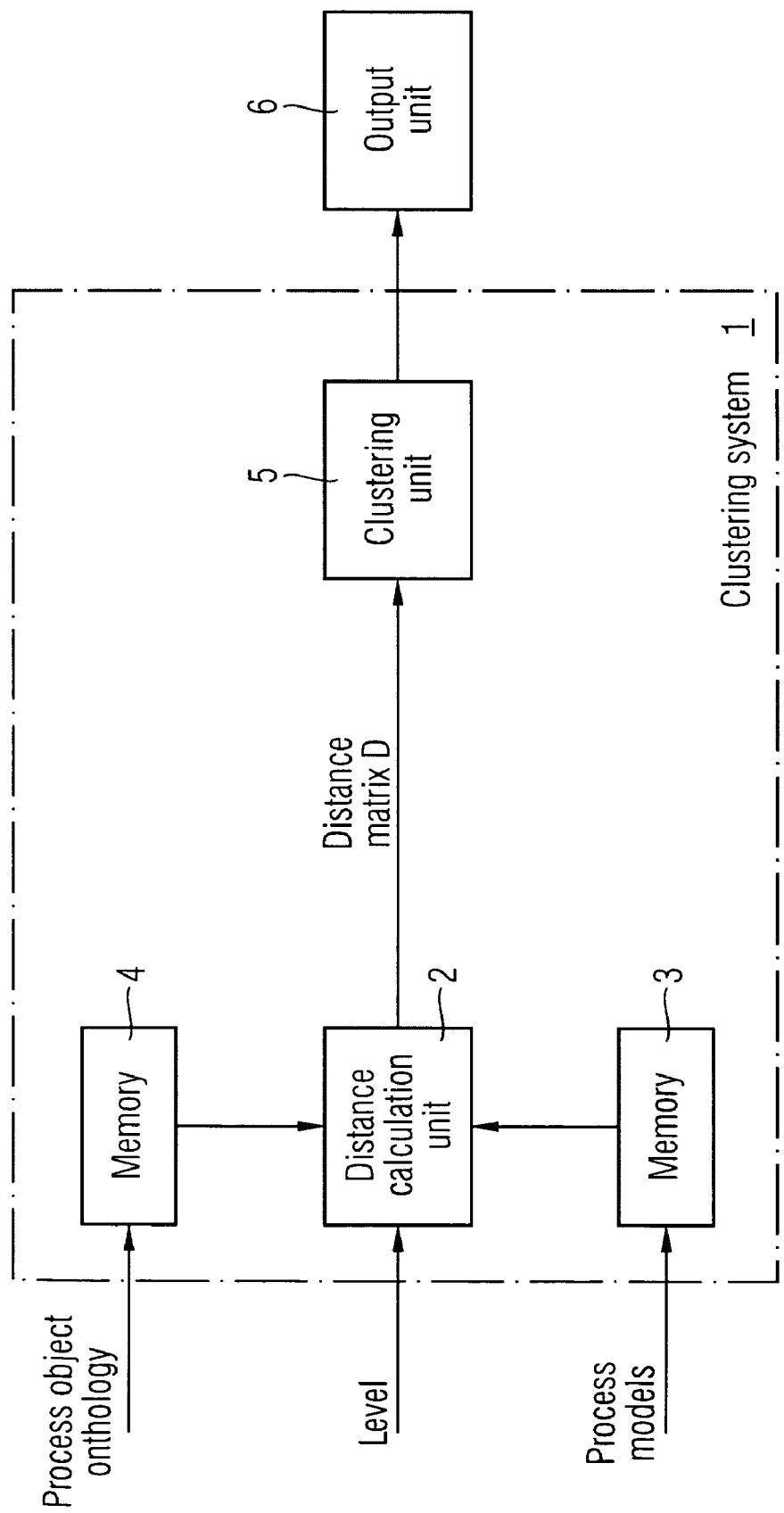
FIG. 1 shows a block diagram of an embodiment of an apparatus for clustering process models according to the present invention.

As can be seen from FIG. 1, an apparatus 1 according to the present invention is provided for clustering process models each consisting of model elements. The model elements comprise at least one text phrase which describes in a natural language, such as English or German, a process activity according to a process modeling language grammar of a processing model language. The processing modeling language can be, for example UML (Unified Modeling Language) or EPC (Event-driven Process Chain).

The apparatus 1 according to the present invention provided for clustering process models comprises in the embodiment as shown in FIG. 1 a distance calculation unit 2 which can be formed by a microprocessor. In a memory 3, process models described in the same or in different process model languages can be stored. Furthermore, in a memory 4 of the clustering apparatus 1, a process object ontology of process objects is stored. Accordingly, the distance calculation unit 2 can read out the process object ontology from the memory 4 and process models to be clustered from the memory 3. The distance calculation unit 2 calculates a distance matrix D. The distance matrix D is calculated by the distance calculation unit 2 by employing a process modeling language grammar of the process modeling language and a natural language grammar of the natural language. The distance matrix D consists of distances d, wherein each distance d of said distance matrix D indicates a dissimilarity of a pair of said process models.

The distances d are calculated by said distance calculation unit 2 according to a selectable calculation level. This calculation level can be set by a user or automatically by another device. In a preferred embodiment, the distance calculation unit 2 performs the calculation of the distances according to four different selectable calculation levels. At a low calculation level, the algorithm is less complex and the calculation time is relatively short. Furthermore, the calculation level occupies only a few resources of the distance calculation unit 2 which might be used for other purposes. With increasing calculation level, the calculation time increases but also the quality of the clustering of said process models.

The lowest calculation level is a native calculation level (level 0). At a native calculation level, a distance between a first process model x and a second process model y read from the memory 3 is calculated by the distance calculation unit 2 depending on a number of model elements which form part only of the second process model y, a number of model elements which form part only of the first process model x and depending on model elements which form part of both process models x, y.

Figure 2:
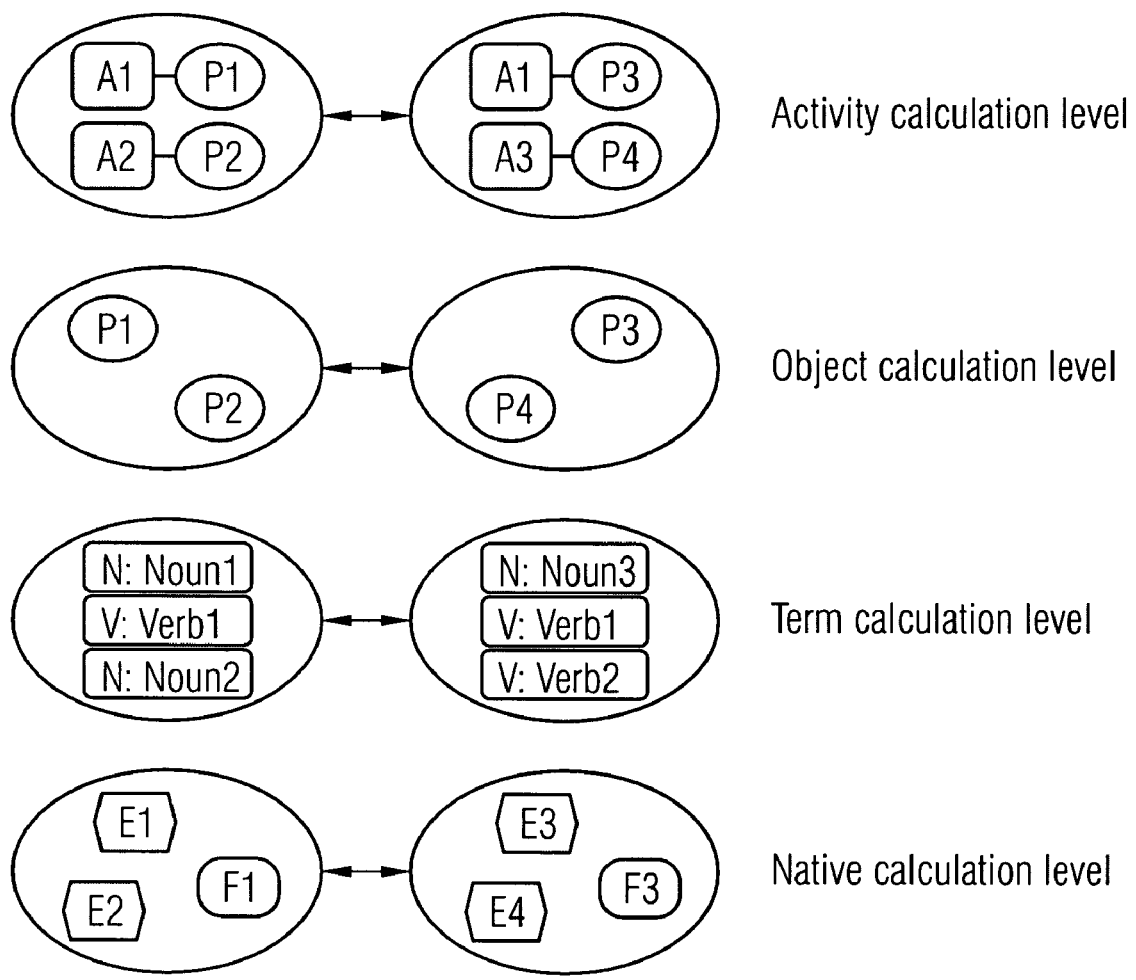
FIG. 2 shows a diagram for illustrating different calculation levels as employed by the method and apparatus according to the present invention.

FIG. 2 illustrates different calculation levels whereas the lowest level, the native calculation level (level 0) is used.

Figure 3:
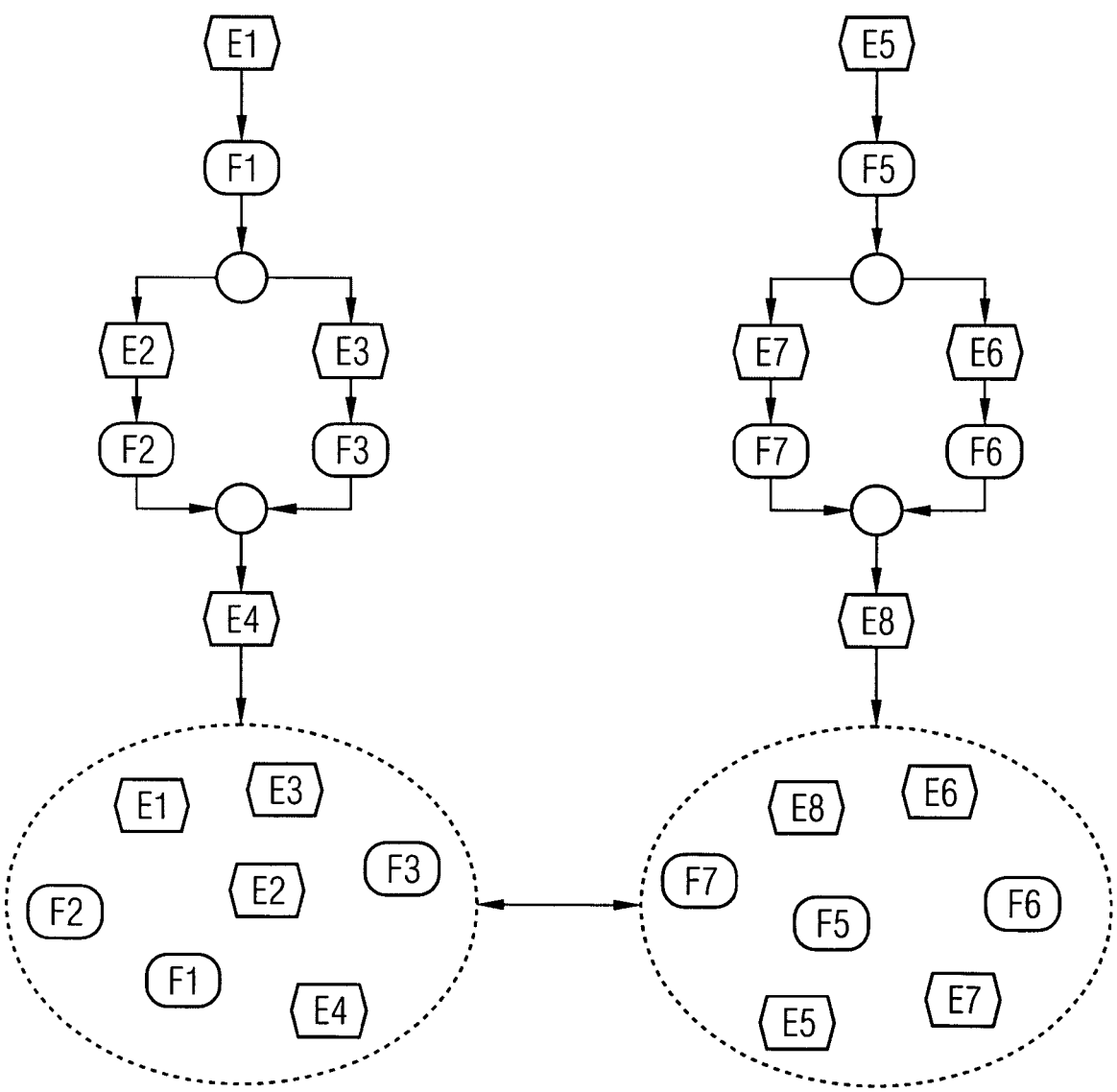
FIG. 3 shows a diagram of an example for illustrating a distance calculation on a native calculation level which can be performed by an apparatus and by a method according to the present invention.

FIG. 3 shows a diagram for illustrating the calculation of a distance between a first process model x and a second process model y on the native calculation level. At this lowest calculation level, no preprocessing is performed but the model elements are taken as such and compared with each other. In the example as shown in FIG. 3, two process models x, y are EPC-models comprising events E represented as hexagons and functions F connected to each other by logical connectors, such as branch connectors and emerge connectors. The more model elements both process models x, y have in common, the lower is the distance d between both process models, i.e. the similarity between the two process models x, y is high. The evaluation whether two model elements are identical is performed at this native calculation level through pure text comparison. For example, two model elements labeled as "hire person" are identical resulting in a distance d=0. In contrast, a comparison of two model elements "hire person" and "employ person" result in a distance d=1 although "hire" and "employ" can be seen as synonyms. Accordingly, at this native calculation level, model elements which are semantically identical, are judged to be dissimilar because of the weakness of the natural language, such as English.

In a possible embodiment, a distance between two process models is calculated on said native calculation level by calculating a Jaccard-distance as follows:

$$dist_{Jaccard}(x, y) = \frac{b+c}{a+b+c}$$

wherein b is a number of model elements which form only part of the second process model (y), c is the number of model elements which form only part of the first process model (x), and a is the number of model elements which form part of both process models (x, y).

Figure 4:
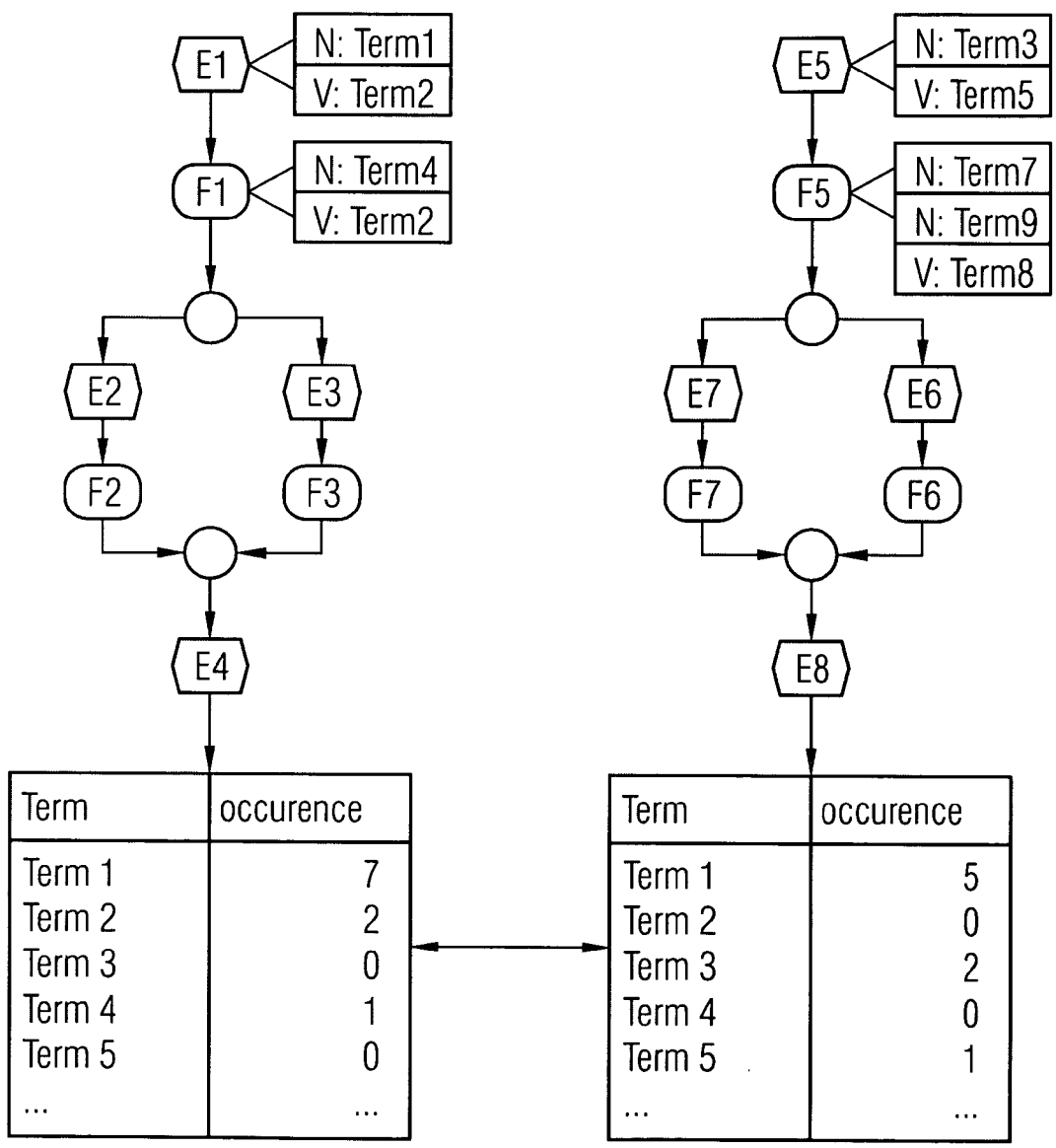
FIG. 4 shows a diagram of an example for illustrating a distance calculation on a term calculation level as performed by the apparatus and method according to the present invention.

To increase the exactness of the clustering, the distance calculation unit 2 can be switched to a higher calculation level, i.e. to a term calculation level (level 1). On the term calculation level, a distance d between a first process model x and a second process model y is calculated on the basis of terms which both process models have in common. FIG. 4 is a diagram for illustrating a simple example showing the calculation of a distance between two process models x, y on a term calculation level. FIG. 4 shows two process models modeled as event-driven process chains EPC. Terms within model elements are classified in the shown embodiment according to a natural language grammar into different word types. These word types can comprise nouns, verbs, articles, conjunctions, prepositions and adjectives. According to the grammar of the process modeling language (in this case EPC), an event model element E comprises a noun N as a first term and a verb V as a second term. Each model x, y can be analyzed to create a word list comprising terms of a dictionary and the respective frequency of occurrence of said terms in the respective process model. The more words or terms both process models x, y have in common, the more similar they are. In a possible embodiment, not only the occurrence of a term or word in the process model is considered but also the respective frequency of occurrence of said word. Words which are quite rare, are weighted less than more frequent words. The word list as shown in FIG. 4 forms a text vector. The text vector is generated for each process model indicating a frequency of occurrence of terms in said process model. In a possible embodiment, stop words of predetermined stop word types are filtered from the terms. In a possible embodiment, the stop word types comprise prepositions, articles and conjunctions according to the grammar of the respective natural language. The text vectors can be used for calculating a distance function of the respective process models.

In a possible embodiment, a distance d between two process models x, y having text vectors V(x)=(x1, ... xn) and V(y)=(y1, ... yn) is calculated as follows:

$$dist_{Cosinus}(x, y) = 1 - \frac{\sum_{i=1}^{n} x_i \cdot y_i}{\sqrt{\sum_{i=1}^{n} x_i^2} \cdot \sqrt{\sum_{i=1}^{n} y_i^2}}$$

wherein $x_i$, $y_i$ indicates the frequency of occurrence of a $term_i$. The calculated distance is a cosinus coefficient.

The frequency occurrence of common terms is calculated as a scalar product of both text vectors and then divided by the product of the length of the vectors. The distance coefficient as calculated above can be interpreted as an angle between two text vectors.

On the term calculation level, the distance calculation is performed on the basis of terms or words taking into account a language knowledge base which is not used on the lower native calculation level.

Figure 5:
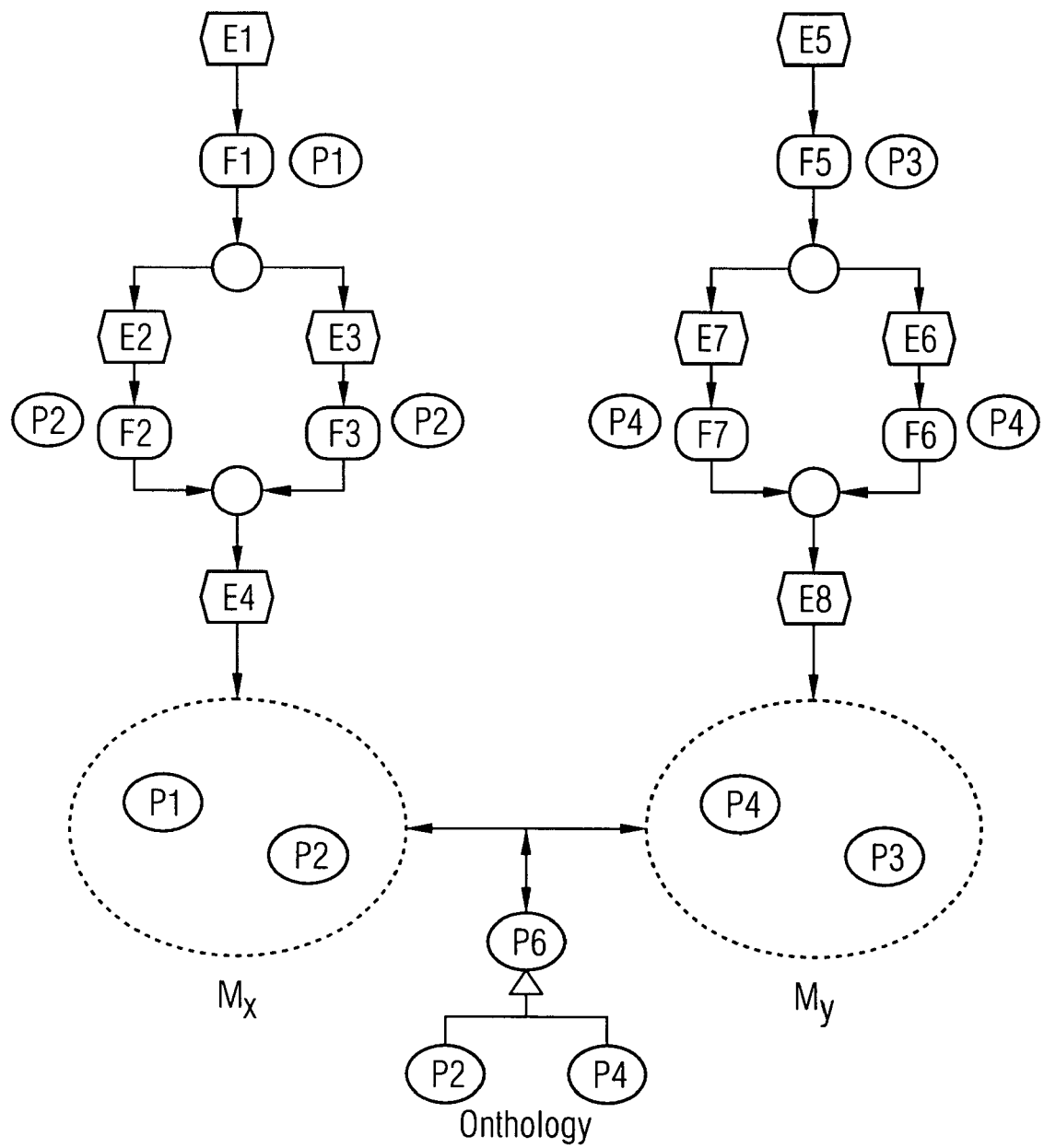
FIG. 5 shows a diagram of an example for illustrating a distance calculation on an object calculation level as employed by the method and apparatus according to the present invention.

On the next higher calculation level, i.e. an object calculation level (level 2), the distance d between a first process model x and the second process model y is calculated on the basis of a process object ontology as stored in the memory 4. FIG. 5 is a diagram illustrating an example for the calculation of a distance d on the object calculation level. As can be seen from FIG. 4, a process object ontology stored in the memory 4 is used to calculate the distance between process model x and process model y. On this level, semantic relationships between process objects are used to increase the exactness of the calculation and clustering. In a possible embodiment, a process object is formed by a term of a predetermined word type. This word type is normally a noun as defined in a natural language grammar. If, for example the function element F1 is labeled by a text phrase "interview applicant", i.e. by the verb V "interview" and the noun N "applicant", the process object is the noun "applicant".

In a possible embodiment, the distance d is calculated in the object calculation level (level 2) between two process models x, y as follows:

$$dist_{PO}(x, y) = \frac{\sum_{p_x \in M_x} dist_{min}(p_x, M_y) + \sum_{p_y \in M_y} dist_{min}(p_y, M_x)}{|M_x| + |M_y|}$$

wherein $dist_{min}(p_x, M_y)$ is the minimum distance between a process object $p_x$ of a model element of a first process model (x) and a set ($M_y$) of process objects $p_y$ of a second process model (y) in said process object ontology:

$$dist_{min}(p_y, M_y) = \min\{dist_{ont}(p_x, p_y)\}$$

wherein $dist_{min}(p_y, M_x)$ is a minimum distance between a process object $p_y$ of a model element of a second process model (y) and a set $M_x$ of process objects $p_x$ of a first process model (x) in said process object ontology:

$$dist_{min}(p_y, M_x) = \min\{dist_{ont}(p_y, p_x)\}$$

wherein $|M_x|+|M_y|$ is the total number of process objects.

In the example which is shown in FIG. 5, $dist_{min}(p2, M_y)$ is the distance between process objects p2 and p4 because according to the object ontology they have a relation to each other and comprise the lowest distance.

The calculation of a distance between two process objects in the process object ontology is calculated in a possible embodiment as follows:

$$dist_{Ont}(p_x, p_y) = 1 - \max_{p \in paths(p_x, p_y)} \cdot \{weight_{migr}^{migr(p)} \cdot weight_{gen}^{gen(p)} \cdot weight_{sib}^{sib(p)} \cdot weight_{mer}^{mer(p)}\}$$

wherein $weight_{migr}$ is a weight of a migrate-two-relationship and migr(p) is the number of migrate-two-relationships along a path p;

$weight_{gen}$ is a weight of a generalization-relationship and gen(p) is the number of generalization-relationships along the path p;

$weight_{sib}$ is a weight of a sibling-relationship and sib(p) is the number of sibling-relationships along a path p; and $weight_{mer}$ is a weight of a meronyme- or part-of-relationship and mer(p) is the number of meronyme- or part-of-relationships within said process object ontology.

For each kind of relationships of process objects, there is a weight which may vary between 0 and 1. Furthermore, there exist one or more paths in the process object ontology to reach one process object from another process object. Accordingly, starting from a process object of a first process model, one follows the relationships of this process object to its neighbors until a target process object of the other process model within the ontology is reached. In a possible embodiment it is counted how many times a relationship in the respective path p has been used. In a possible embodiment, there are four different relationship types, such as a migrates-to-relationship, a generalization-relationship, a sibling-relationship or a part-of-relationship. The number of the respective relationships is counted and stored as variables migr(p), gen(p), sib (p) and mer(p). In a possible embodiment, the weights are not summed but exponentiated. Consequently, in this embodiment, the occurrence of a relationship type has for the first time a higher weight than the following occurrences in the path. This avoids that topics which have been defined in the ontology in more detail leads to higher distances. For example, if the ontology is defined in one field with more detail by adding the weights, the distances are higher than in a field defined with lower detail in the respective ontology. Multiplication lowers the negative impact of this on the clustering. The exponentiation gives a measure for similarity and low distance. Accordingly, the path with the maximum similarity is calculated and subtracted from one as indicated in the creation above.

A possible algorithm for the distance calculation according to the object calculation level (level 2) is given below:

```
double matchProcessObjects (NativeModel m1, NativeModel m2)
    List<ProcessObject> list1 = m1.getProcessObjects( );
    List<ProcessObject> list2 = m2.getProcessObjects( );
    double sumDist1 = 0;
    for each ProcessObject po1 in list1 do
        double distMin = 1;
        for each ProcessObject po2 in list2 do
            double dist = getOntologyDistance(po1, po2);
            if dist < distMin then distMin = dist;
        sumDist1 += distMin;
    double sumDist2 = 0;
    for each ProcessObject po2 in list2 do
        double distMin = 1;
        for each ProcessObject po1 in list1 do
            double dist = getOntologyDistance(po1, po2);
            if dist < distMin then distMin = dist;
        submDist2 += distMin;
    return (sumDist1+sumDist2)/(list1.Count+list2.Count);
```

By calculating a distance d using the process object ontology, semantic relationships are employed. Accordingly, similarities can be detected which are not obvious by simply comparing words or terms with each other.

To increase the exactness of the clustering further, the distance calculation unit 2 as shown in the block diagram of FIG. 1 can calculate a distance between two process models on an activity calculation level (level 3). In this highest calculation level, a distance d between a first process model x and a second process model y is calculated on the basis of a process object ontology and process activities of model elements of said process model.

In a possible embodiment, the process activity is formed by a term of a predetermined word type. This word type of a process activity is formed in a possible embodiment by a verb. The term can be a term within a function model element or an event model element of said process model.

Figure 6:
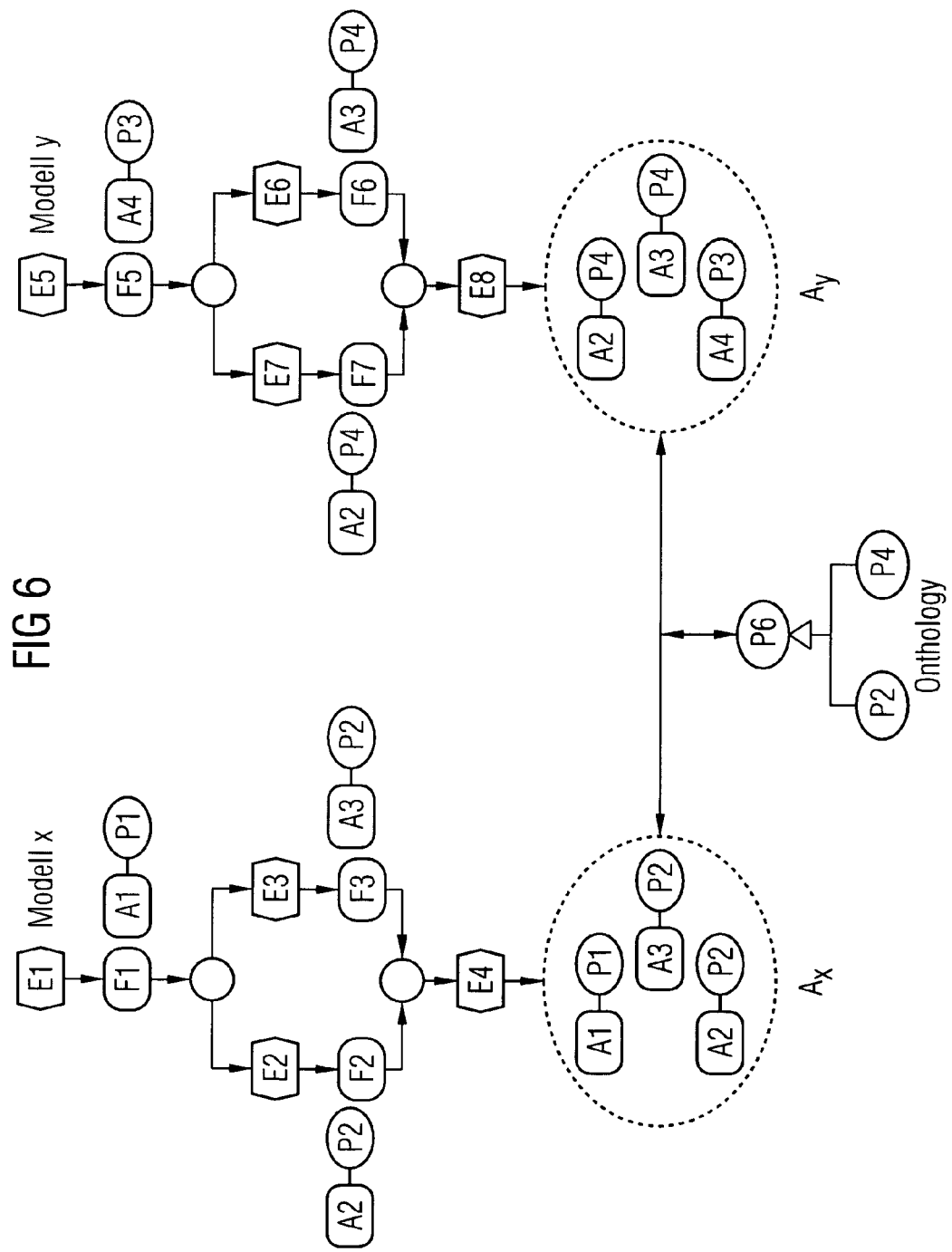
FIG. 6 shows a diagram for illustrating a distance calculation on an activity calculation level as employed by an apparatus and the method according to the present invention.

FIG. 6 shows a diagram for illustrating a simple example for calculating a distance between two process models x, y on an activity calculation level (level 3).

In a possible embodiment, the distance between two process models x, y is calculated on the activity calculation level as follows:

$$dist_{POActivity}(x, y) = \frac{\sum_{a_x \in A_x} dist_{min}(a_x, A_y) + \sum_{a_y \in A_y} dist_{min}(a_y, A_x)}{|A_x| + |A_y|} \quad (5)$$

wherein $dist_{min}(a_x, a_y)$ is the minimum distance between a process activity ($a_x$) of a model element of a first process model (x) on the set $(a_y)$ of process activities $(a_y)$ of a second process model (y) in said process object ontology:

$$dist_{min}(a_x,A_y)=\min\{dist_{activity}(a_x,a_y)\}$$

wherein $dist_{min}(a_y, A_x)$ is the minimum distance between the process activity $(a_y)$ of a model element of said second process model (y) on the set $(A_x)$ of process activities $(a_x)$ of the first process model (x) in said process object ontology:

$$dist_{min}(a_x,A_y)=\min\{dist_{activity}(a_x,a_y)\}$$

wherein $|A_x|+|A_y|$ is the total number of process activities.

In a possible embodiment, a distance between process activities $a_x$, $a_y$ of said process object ontology is calculated as follows:

if activities $a_x$, $a_y$ are dissimilar, the distance is calculated as follows:

$$dist_{activity}(a_x,a_y)=1$$

otherwise:

$$dist_{activity}(a_x,a_y)=weight_{PO}\cdot dist_{ont}(p_x,p_y)$$

wherein $dist_{ont}(p_x, p_y)$ is the distance between process objects $(p_x, p_y)$ in said process object ontology.

In the activity calculation level, the process activities are employed for calculating possible distance functions. The identity of activities is stressed which is desirable if one looks for process models which perform similar or identical activities with different process objects. Besides the process activities, also process objects are included into the calculation.

A distance between a process activity $a_x$ and a second process activity $a_y$ of the other process model is calculated by calculating the minimum distance d to a process activity of said set of process activities.

If no identical process activity is found in the other process model, the distance is 1. If the other process model has one or more identical process activities, the distance of the corresponding process objects is calculated and weighted with a weight $weight_{pO}$. The lowest calculated distance $dist_{min}$ is employed.

The weight $weight_{pO}$ lies between 0 and 1 so that the weighted distance from the ontology does not exceed the maximal distance of 1.

In a possible embodiment, the distance calculation at the activity calculation level can be performed according to the following algorithm:

```
double matchMethodProcessObjectsPairs (NativeModel m1,
NativeModel m2, double weightPO)
    List<MethodPOPair> list1 = m1.getMethodPOPairs( );
    List<MethodPOPair> list2 = m2.getMethodPOPairs( );
    double sumDist1 = 0;
    for each MethodPOPair m1 in list1 do
        double distMin = 1;
        for each MethodPOPair m2 in list2 do
            double dist = 1;
            if m1.Method==m2.Method then
                dist  =  weightPO*getOntologyDistance(m1.PO,
                    m2.PO);
            if dist < distMin then distMin = dist;
        sumDist1 += distMin;
```

-continued
```
    double sumDist2 = 0;
    for each MethodPOPair m2 in list2 do
        double distMin = 1;
        for each MethodPOPair m1 in list1 do
            double dist=1;
            if m1.Method==m2.Method then
                dist = weightPO*getOntologyDistance(m1.PO,
                    m2.PO);
            if dist < distMin then distMin = dist;
    sumDist1 += distMin;
return (sumDist1+sumDist2)/(list1.Count+list2.Count);
```

At the activity calculation level, a distance calculation between two process models is performed by comparing method-process-object-pairs.

The distance calculation unit 2 can be switched between different levels of calculation as shown in FIG. 1. The calculated distance matrix D comprises the calculated distances d each indicating a dissimilarity of a pair of process models x, y. The distance matrix D is applied by the distance calculation unit 2 to a clustering unit 5. The clustering unit 5 can be formed by a separate calculation unit, such as, a microprocessor or by the same processor as the distance calculation unit 2. The clustering unit 5 partitions the models into a set of clusters based on the calculated distance matrix D. In a possible embodiment, the clustering unit 5 partitions said process models into a set of clusters by means of a medoid-based clustering algorithm. In a possible embodiment, the meduit-based clustering algorithm is a CLARANS-algorithm. Similar process models are clustered into the same group of process models.

Figure 7:
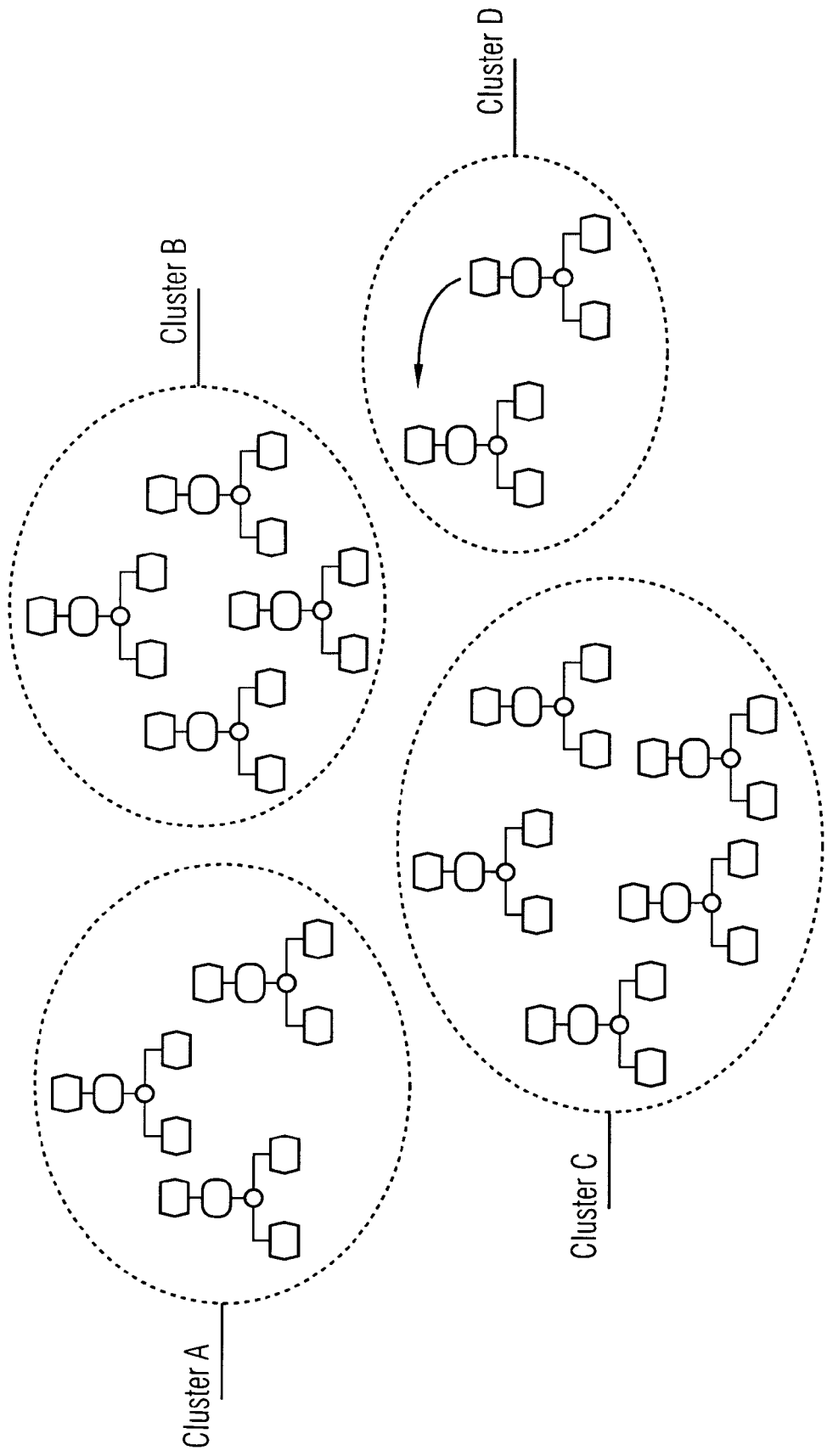
FIG. 7 shows an example for clustering process models according to the method according to the present invention.

FIG. 7 shows an example for clustering process models as performed by the clustering unit 5 as shown in FIG. 1. In the given example, four different clusters (A, B, C, D) are generated. The process models can be from the same or different field, like resource planning, production planning, development etc.

Figures 8, 9:
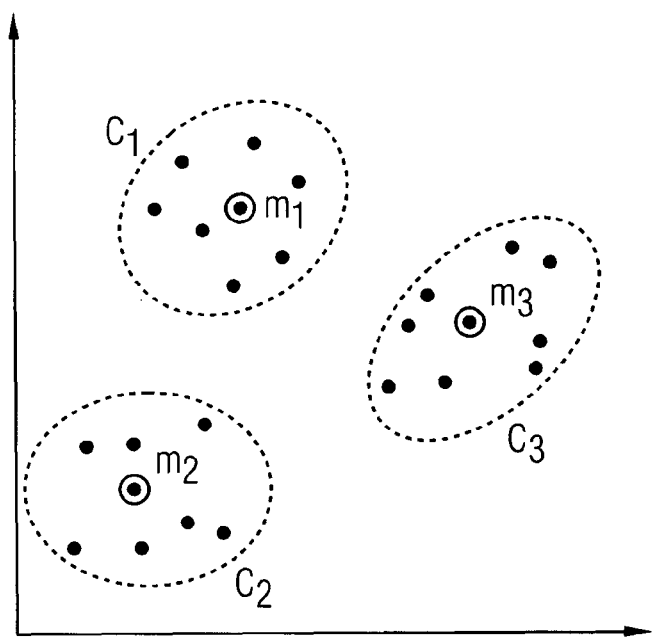
FIG. 8 shows a diagram for illustrating a medoid-based clustering as performed by the method and apparatus according to the present invention.
FIG. 9 shows an example of a distance matrix of process models as employed by the method and apparatus according to the present invention.

FIG. 8 shows a further diagram for illustrating a medoid-based clustering as performed in a preferred embodiment of the method according to the present invention. A medoid within a cluster represents the most central object within said cluster as shown in FIG. 8.

FIG. 9 shows an example of a distance matrix of process models as employed by the method according to the present invention. The clustering algorithm executed by the clustering unit 5 clusters the process models on the basis of a distance matrix D such as shown in FIG. 9.

Figure 10:
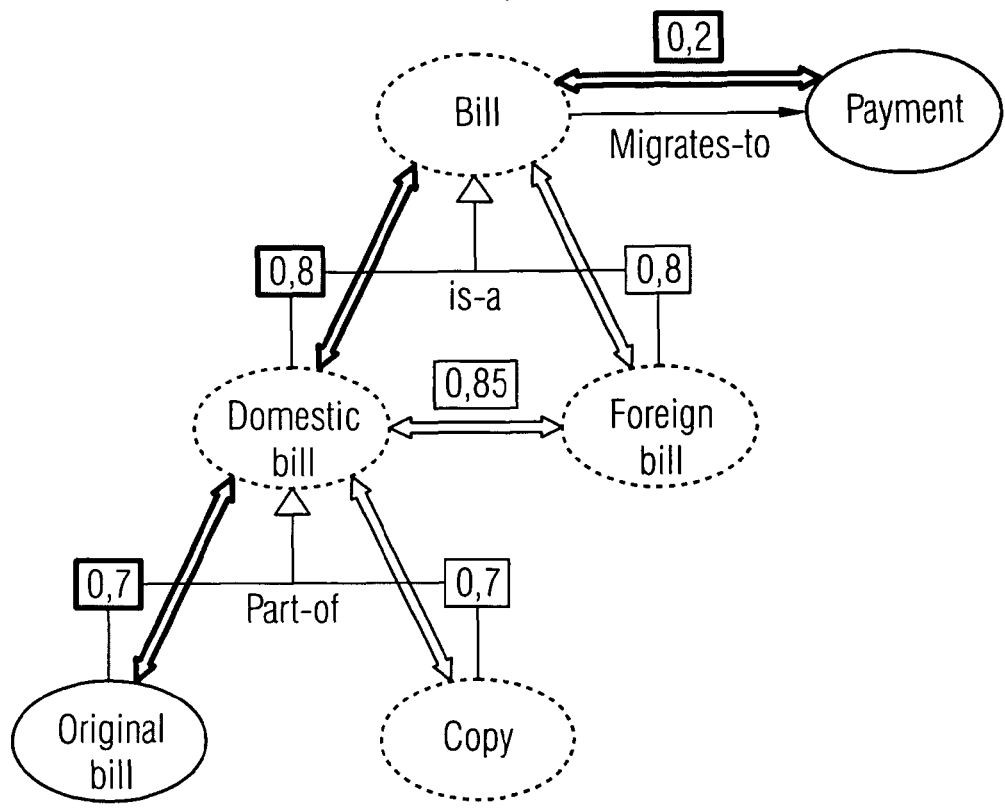
FIG. 10 shows an example for a distance calculation as performed by the method according to the present invention.

FIG. 10 shows an example for a distance calculation using a process object ontology as performed at the process activity calculation level (level 3).

In the give example, the distance d between an original debit note and a payment is $$1-(0.2^1 \cdot 0.8^1 \cdot 0.85^0 \cdot 0.7^1)=1-0.112=0.888.$$

In a possible embodiment, the distance d is calculated for the shortest path between the source model element of a first process model x and a target model element of a second process model y. In a further embodiment for calculating the shortest path a Dijkstra-algorithm is employed.

With the method and apparatus for clustering process models, a systematic classification of similar and not similar process models is possible so that relationships become recognizable.

In a possible embodiment, the apparatus 1 according to the present invention displays the clustered process models on an output unit, such as a display 6.

From the displayed clustered process models it is possible to select the process model most central in the respective cluster. This selected process model can be used as a reference for all process models contained in the respective cluster.

Figure 11:
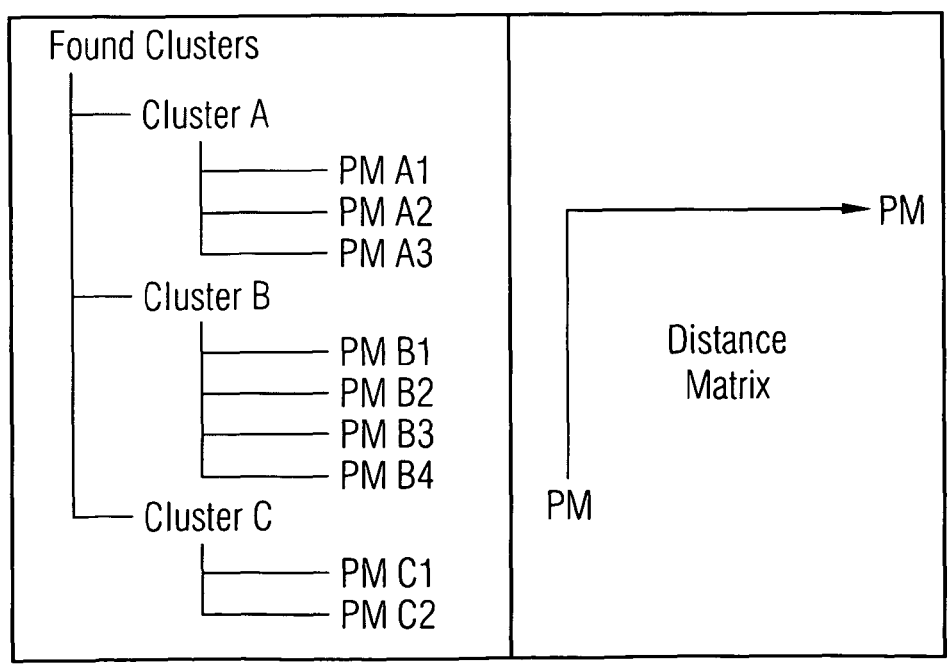
FIG. 11 shows a display of a process model clustered by the method according to the present invention.

FIG. 11 shows clustered process models as displayed on an output unit 6. Identified model clusters are displayed on the left side while a distance matrix is shown on the right side. Accordingly, it easy for a user to manage a plurality of process models with a computer program or a computer program tool comprising computer program commands for performing the method according to the present invention. This computer program can be stored on a data carrier and loaded to a data processing unit, such as a computer.

The invention claimed is:

1. An apparatus for clustering process models each consisting of model elements comprising a text phrase which describes in a natural language a process activity according to a process modeling language grammar and a natural language grammar,
   wherein said apparatus comprises:
     (a) a process object ontology memory for storing a process object ontology;
     (b) a distance calculation unit for calculating a distance matrix employing said processing modeling language grammar and said natural language grammar, wherein said distance matrix consists of distances each indicating a dissimilarity of a pair of said process models; and
     (c) a clustering unit which partitions said process models into a set of clusters based on said calculated distance matrix.

2. The apparatus according to claim 1,
wherein the distances are calculated by said distance unit according to a selected calculation level, which is selectable between
a native calculation level,
a term calculation level,
an object calculation level,
an activity calculation level.

3. The apparatus according to claim 1,
wherein said clustering unit partitions said process models by means of a menoid-based clustering algorithm.

4. The apparatus according to claim 1,
wherein said process modeling language comprises UML (Unified Model Language)-model, an EPC (Event-driven Process Chain)-model, or a petri-network.

5. The apparatus according to claim 1,
wherein said model elements are labeled by text phrases each comprising at least one term.

* * * * *